United States Patent
Wittenberg et al.

(10) Patent No.: US 7,303,290 B2
(45) Date of Patent: Dec. 4, 2007

(54) LASER BEAM FOCUSING ARRANGEMENT AND METHOD

(75) Inventors: Carl Wittenberg, Water Mill, NY (US); Chinh Tan, Setauket, NY (US); Lisa Fan, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 232 days.

(21) Appl. No.: 11/091,855

(22) Filed: Mar. 28, 2005

(65) Prior Publication Data

US 2006/0119805 A1   Jun. 8, 2006

Related U.S. Application Data

(63) Continuation-in-part of application No. 11/043,458, filed on Jan. 26, 2005.

(60) Provisional application No. 60/633,951, filed on Dec. 7, 2004.

(51) Int. Cl.
*G03B 3/00* (2006.01)
*G03B 21/14* (2006.01)
*G02B 3/02* (2006.01)
*G02B 13/18* (2006.01)
*G02B 27/20* (2006.01)
*H01S 3/00* (2006.01)
*H01S 5/00* (2006.01)

(52) U.S. Cl. .......... 353/101; 353/100; 353/31; 353/94; 359/719; 359/728; 362/553; 362/259; 372/50.121; 372/50.23

(58) Field of Classification Search ............ 353/31, 353/37, 84, 94, 98, 99, 102; 359/27, 201, 359/202, 204, 212, 214, 216, 217, 331, 456, 359/460, 719; 348/203, 739, 744, 750, 756, 348/760; 345/1, 88, 108; 250/559.13; 362/553, 362/259; 372/1–3, 5–8, 38.02, 50.12, 71
See application file for complete search history.

(56) References Cited

U.S. PATENT DOCUMENTS

| 4,762,395 A * | 8/1988 | Gordon et al. ............ 359/819 |
| 6,483,556 B1 * | 11/2002 | Karakawa et al. ......... 348/750 |
| 2002/0075916 A1 * | 6/2002 | Sato et al. ................ 372/36 |

* cited by examiner

*Primary Examiner*—Rochelle Blackman
(74) *Attorney, Agent, or Firm*—Kirschstein et al.

(57) ABSTRACT

A lightweight, compact image projection module, especially for mounting in a housing having a light-transmissive window, is operative for causing selected pixels in a raster pattern to be illuminated to produce an image of high resolution of VGA quality or higher in color. A laser beam focusing arrangement aligns a mechanical axis of a focusing lens with an optical axis along which a laser beam is directed to reduce pointing errors.

20 Claims, 7 Drawing Sheets

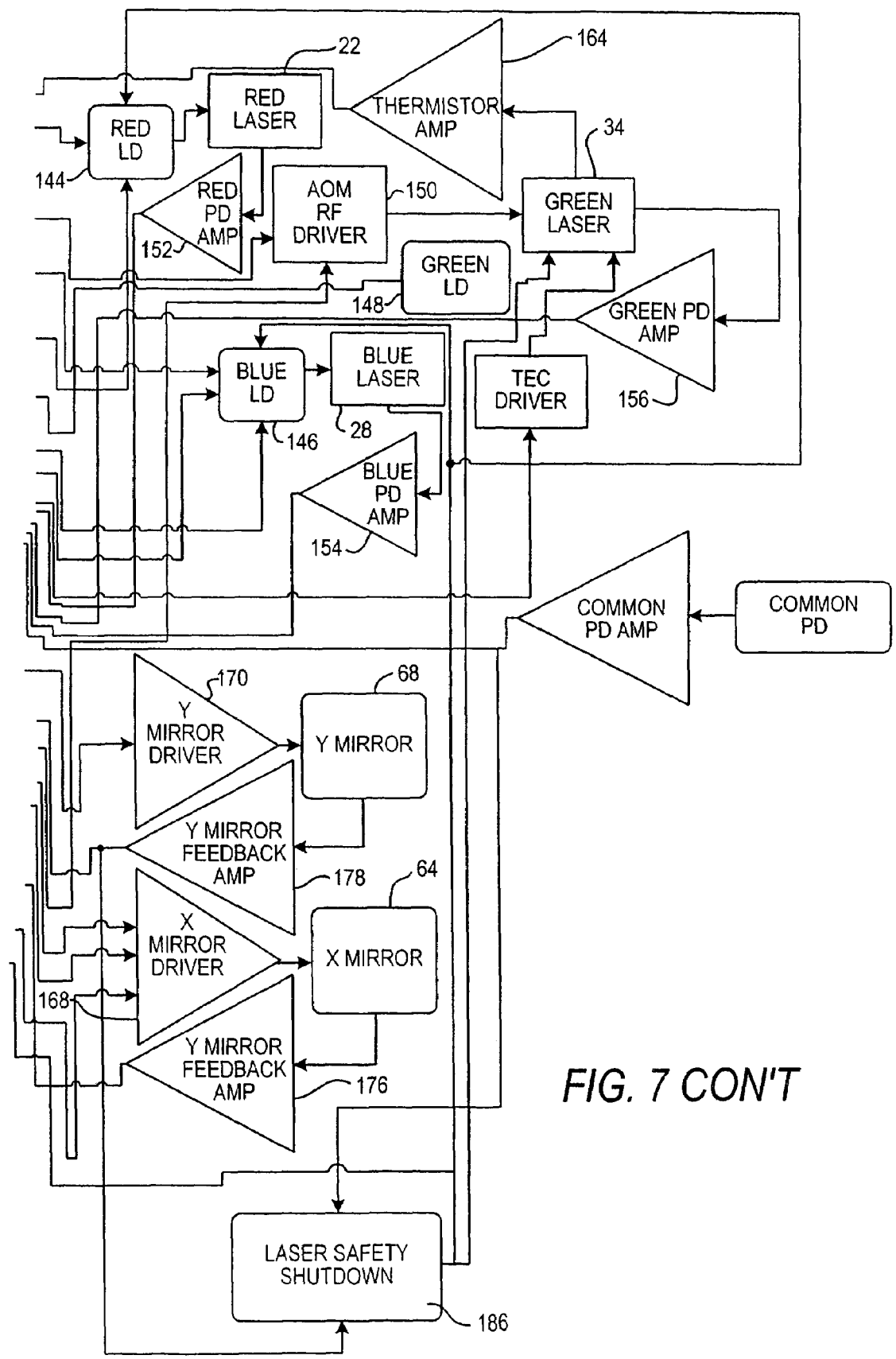
FIG. 7 CON'T

LASER BEAM FOCUSING ARRANGEMENT AND METHOD

CROSS REFERENCE TO RELATED APPLICATION

This application is a continuation-in-part of U.S. patent application Ser. No. 11/043,458, filed Jan. 26, 2005, which, in turn, claims priority to U.S. Provisional Patent Application Ser. No. 60/633,951, filed Dec. 7, 2004.

BACKGROUND OF THE INVENTION

1. Field of the Invention

The present invention generally relates to focusing and aligning one or more laser beams, especially for use in a color image projection system in which laser beams of different wavelengths are used for projecting a two-dimensional image in color on a viewing surface away from the system.

2. Description of the Related Art

It is generally known to project a two-dimensional image on a screen based on a pair of scan mirrors which oscillate in mutually orthogonal directions to scan a laser beam over a raster pattern. However, the known image projection systems project the image with limited resolution, typically less than a fourth of video-graphics-array (VGA) quality of 640×480 pixels, and not in true color.

To obtain a true color image, red, blue and green laser beams emitted by lasers are needed. The wavelengths of such beams are extremely small. For example, a red laser beam has a wavelength on the order of 635-655 nanometers, and a blue laser beam has a wavelength on the order of 430-505 nanometers. These very short wavelength beams must be focused by focusing lenses to a very high degree of accuracy to collect practically all the energy emitted by the lasers and to prevent blurring and aberrations in the projected image. Each focusing lens has a mechanical or centration axis which must be precisely aligned to coincide with the optical axis along which the respective laser beam is directed. Experience has shown that the necessary centration accuracy is too difficult and too expensive to achieve by current precision manufacturing and assembly techniques so that unacceptable pointing errors between the centration axis and the optical axis for each beam unavoidably occur, thereby degrading the projected image.

SUMMARY OF THE INVENTION

OBJECTS OF THE INVENTION

Accordingly, it is a general object of this invention to provide an image projection system that projects a sharp and clear, two-dimensional color image over an extended range of distances away from the system.

Another object of this invention is to focus a laser beam along an optical axis, and to precisely align a centration axis of a focusing lens to coincide with the optical axis.

Still another object of this invention is to increase the resolution of the color image projected by such systems.

Yet another object of this invention is to reduce, if not eliminate, image degradation caused by blurring, aberrations and pointing errors, while still collecting practically all the energy emitted from a laser that emits the laser beam.

An additional object is to provide a miniature, compact, lightweight, and portable color image projection arrangement useful in many instruments of different form factors.

FEATURES OF THE INVENTION

In keeping with these objects and others which will become apparent hereinafter, one feature of this invention resides, briefly stated, in a laser beam focusing arrangement and method, which comprise a laser for emitting a laser beam along an optical axis, a focusing element having a mechanical or centration axis and operative for focusing the laser beam, and means for aligning the mechanical axis to coincide with the optical axis by adjustably mounting the focusing element relative to the laser with freedom of movement in a plane perpendicular to the optical axis. It is this freedom of movement which reduces, if not eliminates, beam pointing error caused by misalignment between the mechanical and optical axes without requiring high precision manufacturing and assembly techniques.

The laser beam focusing arrangement of this invention is of particular benefit in an image projection system for projecting a two-dimensional, color image. The system includes a support; a plurality of red, blue and green lasers for respectively emitting red, blue and green laser beams; an optical assembly for co-linearly arranging the laser beams to form a composite beam; a scanner for sweeping the composite beam as a pattern of scan lines in space at a working distance from the support, each scan line having a number of pixels; and a controller for causing selected pixels to be illuminated, and rendered visible, by the laser beams to produce the color image. The very short wavelengths of these laser beams require precise alignment between the mechanical and optical axes of the beams so that the resulting image is free of blurring, aberrations and poor resolution.

In the preferred embodiment, the scanner includes a pair of oscillatable scan mirrors for sweeping the composite beam along generally mutually orthogonal directions at different scan rates and at different scan angles. At least one of the scan rates exceeds audible frequencies, for example, over 18 kHz, to reduce noise. At least one of the scan mirrors is driven by an inertial drive to minimize power consumption. The image resolution preferably exceeds one-fourth of VGA quality, but typically equals or exceeds VGA quality. The support, lasers, scanner, controller and optical assembly preferably occupy a volume of less than thirty cubic centimeters.

The arrangement is interchangeably mountable in housings of different form factors, including, but not limited to, a pen-shaped, gun-shaped or flashlight-shaped instrument, a personal digital assistant, a pendant, a watch, a computer, and, in short, any shape due to its compact and miniature size. The projected image can be used for advertising or signage purposes, or for a television or computer monitor screen, and, in short, for any purpose desiring something to be displayed.

In accordance with one aspect of this invention, at least one of the lasers, for example, the red laser and/or the blue laser, is stationarily mounted on the support, and a holder for holding the focusing element is mounted on the support for movement between adjustment positions in which the focusing element is moved relative to the laser, and a fixed position in which the focusing element is fixed relative to the laser. The holder is received in an internal compartment of the support and bounds a gap with a pair of opposite support members. A projection, and preferably a plurality of projections, extends from the holder across the gap to contact the support members. These projections constitute the only source of engagement between the holder and the support in any of the adjustment positions.

The support has at least one tool access passage, and preferably a plurality of tool access passages, extending through at least one of the support members. A tool is inserted through the respective tool passage to contact the holder and push it to a desired one of the adjustment positions. The holder pivots about the projections. The support also has at least one adhesive inlet passage, and preferably a plurality of adhesive inlet passages, extending through at least one of the support members to enable a curable adhesive to be introduced through the respective inlet passage into the gap surrounding the holder. Once the adhesive cures around the holder, the holder is fixed in the fixed position in which the mechanical axis is aligned to coincide with the optical axis.

Preferably, the adhesive is curable by ultraviolet (UV) light. The holder is advantageously constituted of a material transmissive to UV light to facilitate such curing. The holder is also advantageously constituted of glass fibers embedded in a synthetic plastic material. Preferably, the glass fibers are oriented to be generally parallel to the mechanical axis. The amount of glass fibers is controlled so as to impart a thermal coefficient of linear expansion to the holder which matches that of the laser so that relative linear movement between the laser and the holder during a temperature change is minimized.

As described, the holder is free to move along at least two mutually orthogonal directions in said plane and, in addition, is free to move axially along the optical axis. These multiple freedoms of movement enable a very precise alignment between the mechanical and optical axis of a respective laser to insure an optimum image.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figures 1, 2:
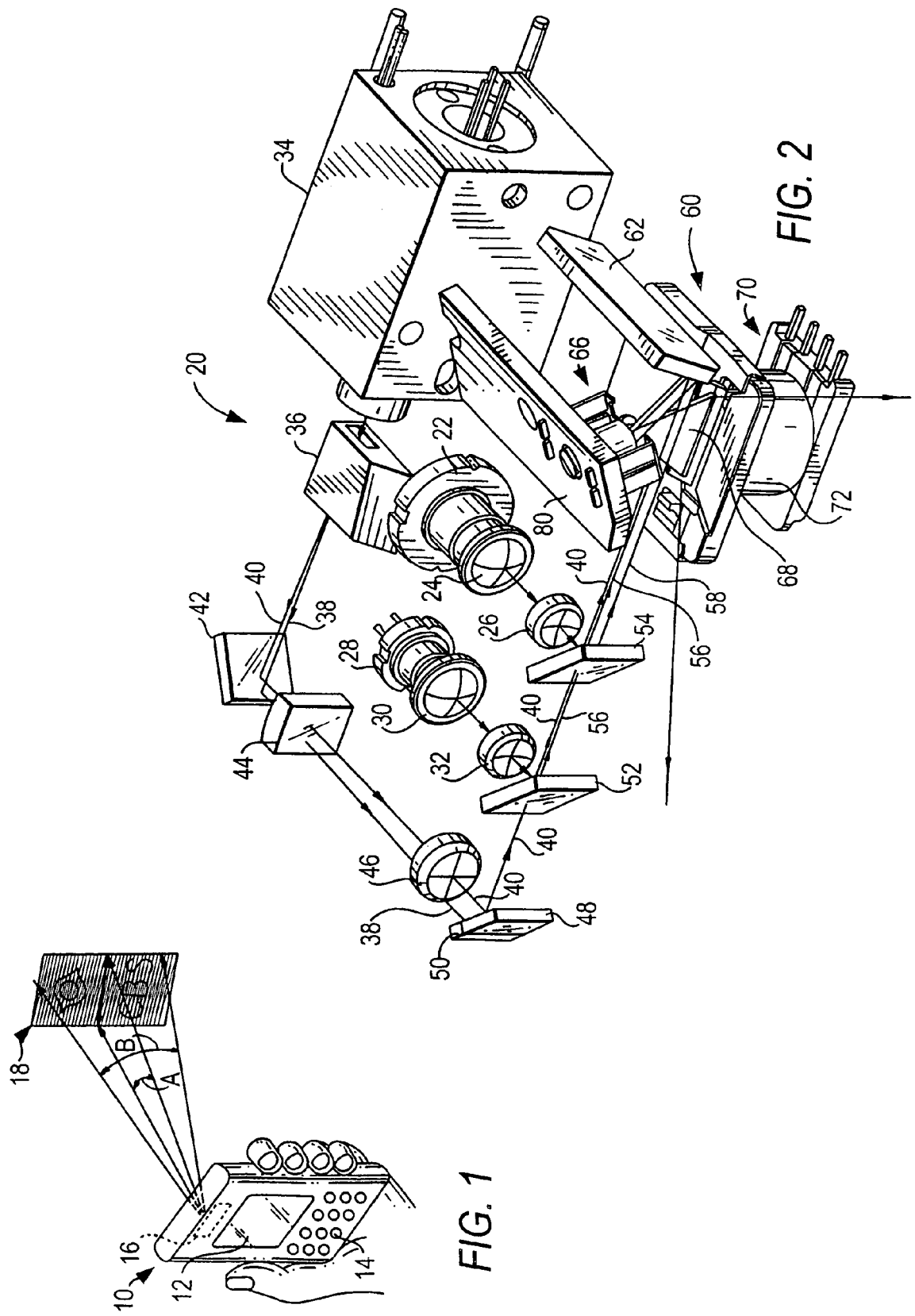
FIG. 1 is a perspective view of a hand-held instrument projecting an image at a working distance therefrom.
FIG. 2 is an enlarged, overhead, perspective view of an image projection arrangement in accordance with this invention for installation in the instrument of FIG. 1.

Reference numeral 10 in FIG. 1 generally identifies a hand-held instrument, for example, a personal digital assistant, in which a lightweight, compact, image projection arrangement 20, as shown in FIG. 2, is mounted and operative for projecting a two-dimensional color image at a variable distance from the instrument. By way of example, an image 18 is situated within a working range of distances relative to the instrument 10.

As shown in FIG. 1, the image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

The parallelepiped shape of the instrument 10 represents just one form factor of a housing in which the arrangement 20 may be implemented. The instrument can be shaped as a pen, a cellular telephone, a clamshell or a wristwatch, as, for example, shown in U.S. patent application Ser. No. 10/090,653, filed Mar. 4, 2002, assigned to the same assignee as the instant application, and incorporated herein by reference thereto.

In the preferred embodiment, the arrangement 20 measures less than about 30 cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Figure 3:
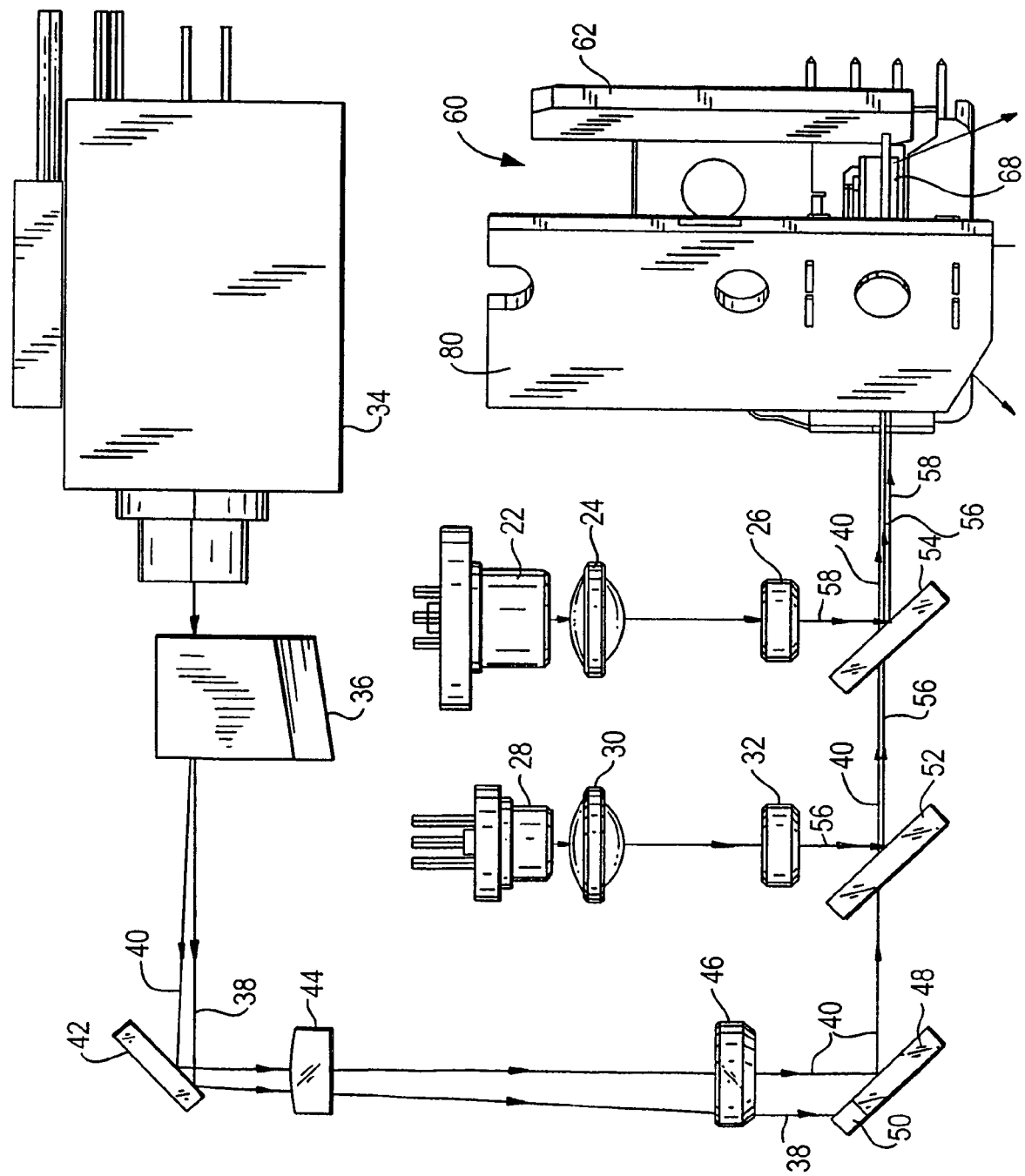
FIG. 3 is a top plan view of the arrangement of FIG. 2.
Figure 8:
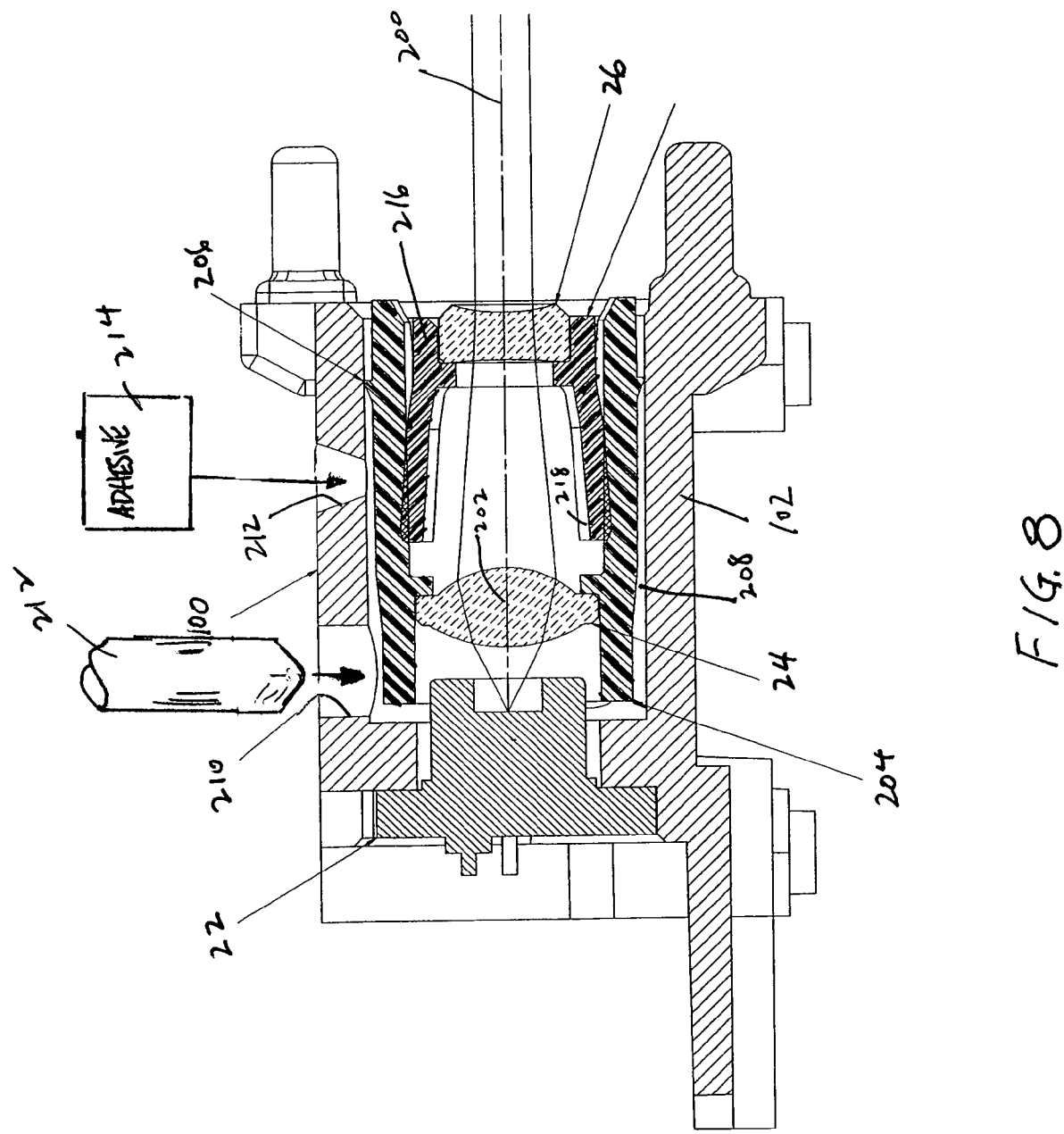
FIG. 8 is a sectional view taken on line 8-8 of FIG. 6.

Referring to FIGS. 2 and 3, the arrangement 20 includes a semiconductor laser 22 which, when energized, emits a bright red laser beam at about 635-655 nanometers. Lens 24 is a biaspheric convex lens having a positive focal length and is operative for collecting virtually all the energy in the red beam and for producing a diffraction-limited beam. Lens 26 is a concave lens having a negative focal length. As best seen in FIG. 8, lenses 24, 26 are held by respective lens holders apart on a support (not illustrated in FIG. 2 for clarity) inside the instrument 10. The lenses 24, 26 shape the red beam profile over the working distance.

Another semiconductor laser 28 is mounted on the support and, when energized, emits a diffraction-limited blue laser beam at about 430-505 nanometers. Another biaspheric convex lens 30 and a concave lens 32 are employed to shape the blue beam profile in a manner analogous to lenses 24, 26.

A green laser beam having a wavelength on the order of 530 nanometers is generated not by a semiconductor laser, but instead by a green module 34 having an infrared diode-pumped YAG crystal laser whose output beam is 1060 nanometers. A non-linear frequency doubling crystal is included in the infrared laser cavity between the two laser mirrors. Since the infrared laser power inside the cavity is much larger than the power coupled outside the cavity, the frequency doubler is more efficient generating the double frequency green light inside the cavity. The output mirror of the laser is reflective to the 1060 nm infrared radiation, and transmissive to the doubled 530 nm green laser beam. Since the correct operation of the solid-state laser and frequency doubler require precise temperature control, a semiconductor device relying on the Peltier effect is used to control the temperature of the green laser module. The thermo-electric cooler can either heat or cool the device depending on the polarity of the applied current. A thermistor is part of the green laser module in order to monitor its temperature. The readout from the thermistor is fed to the controller, which adjusts the control current to the thermo-electric cooler accordingly.

As explained below, the lasers are pulsed in operation at frequencies on the order of 100 MHz. The red and blue semiconductor lasers 22, 28 can be pulsed at such high frequencies, but the currently available green solid-state lasers cannot. As a result, the green laser beam exiting the green module 34 is pulsed with an acousto-optical modulator 36 which creates an acoustic standing wave inside a crystal for diffracting the green beam. The modulator 36, however, produces a zero-order, non-diffracted beam 38 and a first-order, pulsed, diffracted beam 40. The beams 38, 40 diverge from each other and, in order to separate them to eliminate the undesirable zero-order beam 38, the beams 38, 40 are routed along a long, folded path having a folding mirror 42. Alternatively, an electro-optic modulator can be used either externally or internally to the green laser module to pulse the green laser beam. Other possible ways to modulate the green laser beam include electro-absorption modulation, or Mach-Zender interferometer. The beams 38, 40 are routed through positive and negative lenses 44, 46. However, only the diffracted green beam 40 is allowed to impinge upon, and reflect from, the folding mirror 48. The non-diffracted beam 38 is absorbed by an absorber 50, preferably mounted on the mirror 48.

The arrangement includes a pair of dichroic filters 52, 54 arranged to make the green, blue and red beams as co-linear as possible before reaching a scanning assembly 60. Filter 52 allows the green beam 40 to pass therethrough, but the blue beam 56 from the blue laser 28 is reflected by the interference effect. Filter 54 allows the green and blue beams 40, 56 to pass therethrough, but the red beam 58 from the red laser 22 is reflected by the interference effect.

Figure 4:
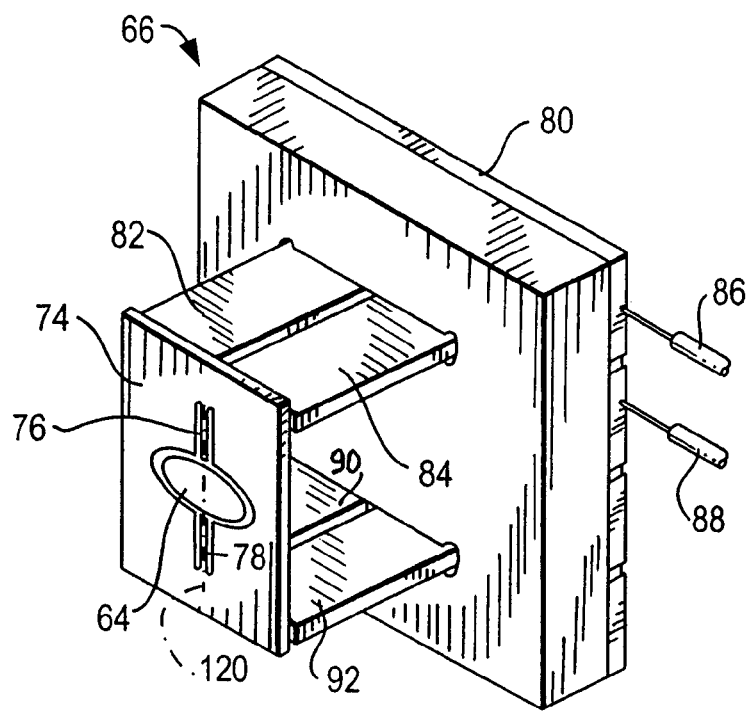
FIG. 4 is a perspective front view of an inertial drive for use in the arrangement of FIG. 2.
Figure 5:
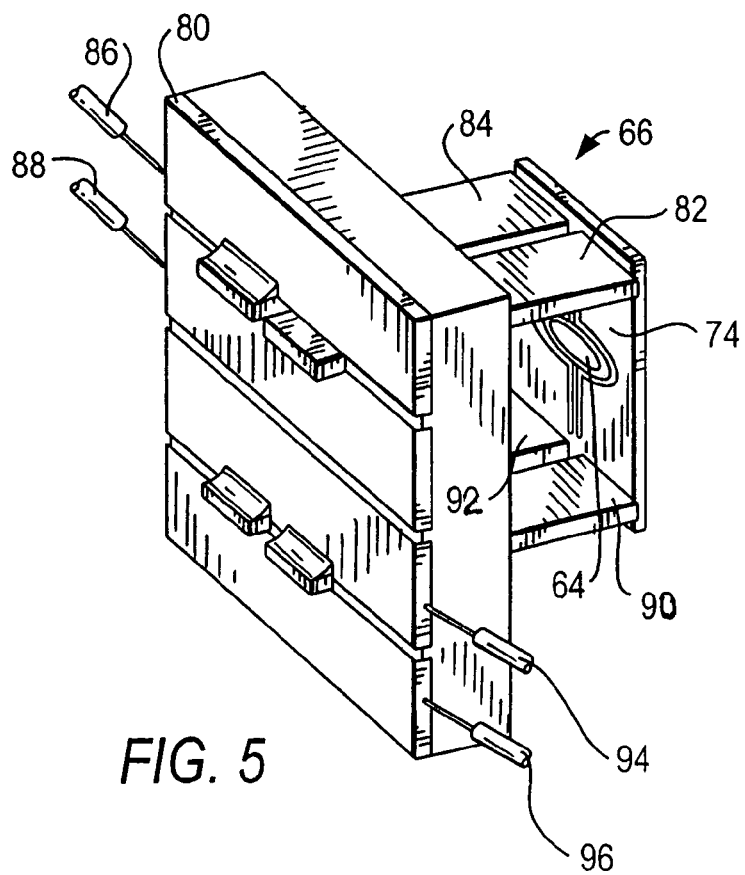
FIG. 5 is a perspective rear view of the inertial drive of FIG. 4.

The nearly co-linear beams 40, 56, 58 are directed to, and reflected off, a stationary bounce mirror 62. The scanning assembly 60 includes a first scan mirror 64 oscillatable by an inertial drive 66 (shown in isolation in FIGS. 4-5) at a first scan rate to sweep the laser beams reflected off the bounce mirror 62 over the first horizontal scan angle A, and a second scan mirror 68 oscillatable by an electromagnetic drive 70 at a second scan rate to sweep the laser beams reflected off the first scan mirror 64 over the second vertical scan angle B. In a variant construction, the scan mirrors 64, 68 can be replaced by a single two-axis mirror.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of co-linear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of a one-piece, generally planar, silicon substrate which is approximately 150μ thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 749μ×1600μ. Each hinge portion measure 27μ in width and 1130μ in length. The frame has a rectangular shape measuring 3100μ in width and 4600μ in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150μ thick, and the scan mirror has a high Q factor. A movement on the order of 1μ by each transducer can cause oscillation of the scan mirror at scan rates in excess of 20 kHz.

Another pair of piezoelectric transducers 90, 92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown).

Alternately, instead of using piezo-electric transducers 90, 92 for feedback, magnetic feedback can be used, where a magnet is mounted on the back of the high-speed mirror, and an external coil is used to pickup the changing magnetic field generated by the oscillating magnet.

Although light can reflect off an outer surface of the scan mirror, it is desirable to coat the surface of the mirror 64 with a specular coating made of gold, silver, aluminum, or a specially designed highly reflective dielectric coating.

The electromagnetic drive 70 includes a permanent magnet jointly mounted on and behind the second scan mirror 68, and an electromagnetic coil 72 operative for generating a periodic magnetic field in response to receiving a periodic drive signal. The coil 72 is adjacent the magnet so that the periodic field magnetically interacts with the permanent field of the magnet and causes the magnet and, in turn, the second scan mirror 68 to oscillate.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate on the order of 40 Hz which is fast enough to allow the image to persist on a human eye retina without excessive flicker.

The faster mirror 64 sweeps a horizontal scan line, and the slower mirror 68 sweeps the horizontal scan line vertically, thereby creating a raster pattern which is a grid or sequence of roughly parallel scan lines from which the image is constructed. Each scan line has a number of pixels. The image resolution is preferably XGA quality of 1024×768 pixels. Over a limited working range we can display high-definition television standard, denoted 720p, 1270×720 pixels. In some applications, a one-half VGA quality of 320×

480 pixels, or one-fourth VGA quality of 320×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive.

The slow-mirror is operated in a constant velocity sweep-mode during which time the image is displayed. During the mirror's return, the mirror is swept back into the initial position at its natural frequency, which is significantly higher. During the mirror's return trip, the lasers can be powered down in order to reduce the power consumption of the device.

Figure 6:
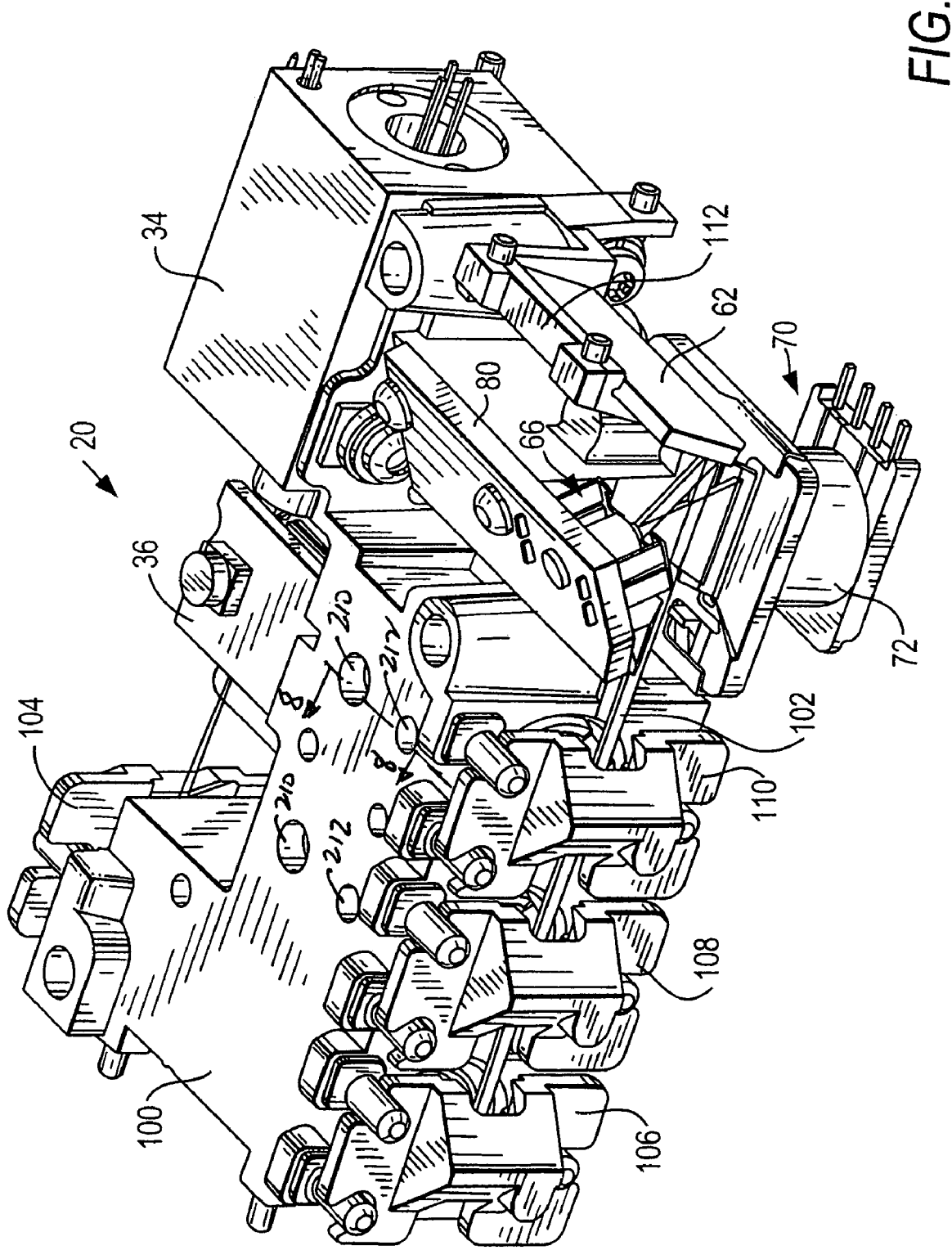
FIG. 6 is a perspective view of a practical implementation of the arrangement of FIG. 2.

FIG. 6 is a practical implementation of the arrangement 20 in the same perspective as that of FIG. 2. The aforementioned components are mounted on a support which includes a top cover 100 and a support plate 102. Holders 104, 106, 108, 110, 112 respectively hold folding mirrors 42, 48, filters 52, 54 and bounce mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprise the image, which can be any display of human- or machine-readable information or graphic.

Referring to FIG. 1, the raster pattern is shown in an enlarged view. Starting at an end point, the laser beams are swept by the inertial drive along the horizontal direction at the horizontal scan rate to an opposite end point to form a scan line. Thereupon, the laser beams are swept by the electromagnetic drive 70 along the vertical direction at the vertical scan rate to another end point to form a second scan line. The formation of successive scan lines proceeds in the same manner.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective superimposition of one or more of the red, blue, and green lasers. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7:
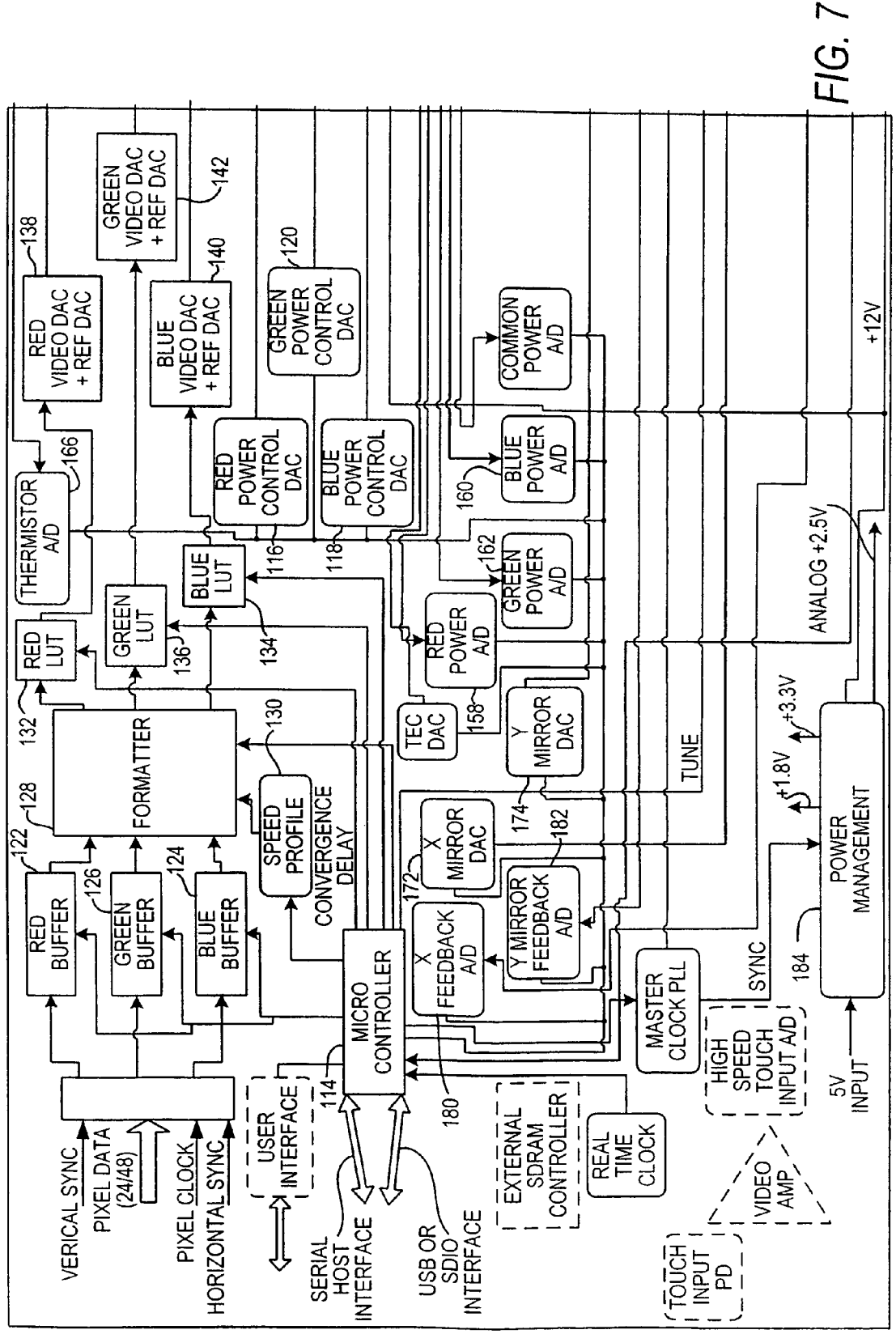
FIG. 7 is an electrical schematic block diagram depicting operation of the arrangement of FIG. 2.

As shown in FIG. 7, an incoming video signal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to an acousto-optical module (AOM) radio frequency (RF) driver 150 and, in turn, to the green laser 34 which is also connected to a green LD 148 and to the green power controller 120.

Feedback controls are also shown in FIG. 7, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

A laser safety shut down circuit 186 is operative to shut the lasers off if either of the scan mirrors 64, 68 is detected as being out of position.

Turning to FIG. 8, the red laser 22 and the lenses 24, 26 are shown in position relative to a chassis in which the top cover 100 and the support plate 102 are integral with each other. The blue laser 28 and the lenses 30, 32 have a similar positioning. Each laser 22, 28 emits a laser beam along a respective optical axis 200. The focusing lens 24, 30 is a strong positive aspheric lens and has a centration or mechanical axis 202 determined by the way that the lens is mounted within a hollow, tubular holder 204. As shown, the holder has an axial internal passage, and the lens 24 is fixedly mounted at an end region closer to the laser.

Ideally, the optical and mechanical axes exactly coincide in a perfectly centered lens. However, mechanical tolerances on the lens, the holder, the laser, and the support all contribute to centration error, that is, the amount of separation of these two axes measured at the focal point of the lens. The centration angle is equal to the inverse tangent of the radial separation divided by the focal length and, in accordance with this invention, the centration angle is to be made as close to zero as possible, especially considering the very short wavelengths of the red laser 22 and/or of the blue laser 28, to insure that the laser beams are accurately focused and aligned to project an image of high resolution and free of defects.

The laser 22 is stationarily supported within the chassis, preferably within a cylindrical compartment in which the holder 204 is received. At least one projection, and preferably a plurality of projections 206 equiangularly arranged about the mechanical axis 202, extends radially from an exterior wall of the holder to engage the chassis with an interference fit.

As best seen in FIG. 8, there is an annular gap 208 between the exterior wall of the holder and the chassis. The projections 206 constitute the only contacting areas between the holder and the chassis. The opposite end of the holder is thus free to move up-and-down and/or side-to-side in two mutually orthogonal directions in a plane perpendicular to the optical axis 200 by pivoting about the projections. The holder is also free to move axially along the optical axis by axially pushing or pulling the holder so that the projections slide smoothly relative to the chassis, thereby providing three freedoms of movements by which to align the mechanical axis 202 of the lens 24 with the optical axis 200.

The chassis has at least one tool access passage, and preferably a plurality of tool access passages 210 (only one shown), for insertion of a tool 212 to engage the holder and push it to a desired adjustment position in which the mechanical and optical axes are adjusted. The cover also has at least one adhesive inlet passage, and preferably a plurality of adhesive inlet passages 212, for introduction of a curable adhesive 214 into the gap 208 surrounding the holder to fix the holder after alignment in a fixed position upon curing.

To facilitate such curing, the adhesive is curable by ultraviolet (UV) light, and the holder is constituted of a synthetic plastic material, such as glass fiber-filled polycarbonate, which is translucent to UV light. The UV light is beamed through the opposite end region of the holder, i.e., further from the laser. The UV light passes through the translucent holder and cures the adhesive everywhere around the holder, thereby effectively potting the holder in place after adjustment.

The glass fibers in the holder are oriented to lie generally parallel to the optical axis, and the quantity of the glass fibers is controlled so as to impart a thermal coefficient of linear expansion that matches that of the laser to minimize separation between the laser and the holder during temperature changes.

The lens 26, which is a negative lens, is also mounted within the holder 204. Lens 26 is fixed within a hollow tubular sleeve 216, preferably constituted of polycarbonate. The sleeve 216 is axially inserted through the opposite end region of the holder. A plurality of resilient legs 218 engage an interior wall of the holder and hold the sleeve 216 in place. Lens 26 is thus adjusted in focus by pushing on the front of the lens 26. The sleeve 216 is fixed in place by introducing a UV-curable adhesive from the front of the holder and exposing the front of the holder to UV light.

With the optical and mechanical axes for the red and blue lasers aligned, the image not only has a high resolution, but also, the numerical aperture of the focusing system is high enough to insure that enough laser light is captured for a bright display.

It will be understood that each of the elements described above, or two or more together, also may find a useful application in other types of constructions differing from the types described above.

While the invention has been illustrated and described as embodied in a laser beam focusing arrangement and method, particularly for use in a color image projection arrangement and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A laser beam focusing arrangement, comprising:
    a) a laser for emitting a laser beam along an optical axis, the laser being a semiconductor laser in which the laser beam has a wavelength in a range from 430-655 nanometers;
    b) a focusing element having a mechanical axis, and operative for focusing the laser beam, the focusing element being an aspheric lens having a focal length not exceeding 4 millimeters; and
    c) means for aligning the mechanical axis to coincide with the optical axis by adjustably mounting the focusing element relative to the laser with freedom of movement in a plane perpendicular to the optical axis.

2. The focusing arrangement of claim 1, and a support for stationarily supporting the laser, and wherein the aligning means includes a holder for holding the focusing element, the holder being mounted on the support for movement between adjustment positions in which the focusing element is moved relative to the laser, and a fixed position in which the focusing element is fixed relative to the laser.

3. The focusing arrangement of claim 2, wherein the support includes support members spaced apart from each other to bound a compartment, and wherein the holder is mounted in the compartment and bounds a gap with the support members.

4. The focusing arrangement of claim 3, wherein the holder is a hollow tubular sleeve having an interior in which the focusing element is mounted, and an exterior wall on which at least one projection extends radially across the gap to engage the support members.

5. The focusing arrangement of claim 4, wherein the exterior wall has a plurality of projections equiangularly arranged about the mechanical axis.

6. The focusing arrangement of claim 4, wherein at least one of the support members has a tool access passage extending to the compartment to enable a tool to move the holder to one of said adjustment positions.

7. The focusing arrangement of claim 4, wherein at least one of the support members has an adhesive inlet extending to the compartment, and a curable adhesive injected through the inlet to fix the holder in said fixed position upon curing.

8. The focusing arrangement of claim 2, wherein the holder is mounted on the support with freedom of movement along at least two mutually orthogonal directions in said plane, and wherein the holder is also mounted on the support for axial movement along the optical axis.

9. The focusing arrangement of claim 2, and another focusing element for also focusing the laser beam, the other focusing element being mounted in a tube mounted within the holder and spaced from the first-mentioned focusing element.

10. The focusing arrangement of claim 9, wherein the tube has resilient portions for engaging the holder with freedom of movement along the optical axis.

11. A method of focusing and aligning a laser beam, comprising the steps of:
  a) emitting a laser beam along an optical axis by energizing a laser;
  b) stationarily supporting the laser on a support having support members spaced apart from each other to bound a compartment;
  c) focusing the laser beam with a focusing element having a mechanical axis; and
  d) aligning the mechanical axis to coincide with the optical axis by adjustably mounting the focusing element relative to the laser with freedom of movement in a plane perpendicular to the optical axis, by pushing a holder for holding the focusing element with a tool, at least one of the support members having a tool access passage extending to the compartment to enable to tool to move the holder.

12. The method of claim 11, wherein the aligning step is performed by moving the focusing element along at least two mutually orthogonal directions in said plane, and fixing the focusing element in a fixed position relative to the laser.

13. The method of claim 12, wherein the fixing step is performed by introducing a curable adhesive around the holder.

14. An arrangement for laser beam focusing and alignment during image projection, comprising:
  a) a support including a chassis having an interior compartment, the chassis having a tool access port and an adhesive access port;
  b) a laser assembly supported by the support, for emitting a plurality of laser beams of different wavelengths, the laser assembly including at least one laser for emitting at least one of the beams along an optical axis;
  c) a scanner supported by the support, for sweeping a pattern of scan lines in space at a working distance from the support, each scan line having a number of pixels;
  d) a controller operatively connected to the laser assembly and the scanner, for causing selected pixels to be illuminated, and rendered visible, by the laser beams to produce an image; and
  e) an optical assembly supported by the support between the laser assembly and the scanner, for focusing and substantially co-linearly arranging the laser beams to form a composite beam which is directed to the scanner, the optical assembly including at least one focusing element having a mechanical axis and operative for focusing the at least one beam, and means for aligning the mechanical axis to coincide with the optical axis by adjustably mounting the at least one focusing element relative to the at least one laser with freedom of movement in a plane perpendicular to the optical axis, the optical assembly including a holder for holding the at least one focusing element within the interior compartment of the chassis, the holder being moved by a tool in the tool access passage, and the holder being fixed in position within the interior compartment by a curable adhesive injected through the adhesive access port.

15. The arrangement of claim 14, wherein the at least one laser is one of a red and a blue semiconductor laser, and wherein the focusing element is a lens.

16. The arrangement of claim 14, wherein the holder is movable along the optical axis.

17. A laser beam focusing arrangement, comprising:
  a) a laser for emitting a laser beam along an optical axis;
  b) a support for stationarily supporting the laser, the support including support members spaced apart from each other to bound a compartment;
  c) a focusing element having a mechanical axis, and operative for focusing the laser beam; and
  d) means for aligning the mechanical axis to coincide with the optical axis by adjustably mounting the focusing element relative to the laser with freedom of movement in a plane perpendicular to the optical axis, the aligning means including a holder for holding the focusing element, the holder being mounted on the support for movement between adjustment positions in which the focusing element is moved relative to the laser, and a fixed position in which the focusing element is fixed relative to the laser, the holder being mounted in the compartment and bounding a gap with the support members, the holder being a hollow tubular sleeve having an interior in which the focusing element is mounted, and an exterior wall on which at least one projection extends radially across the gap to engage the support members, at least one of the support members having a tool access passage extending to the compartment to enable a tool to move the holder to one of said adjustment positions.

18. A laser beam focusing arrangement, comprising:
  a) a laser for emitting a laser beam along an optical axis;
  b) a support for stationarily supporting the laser, the support including support members spaced apart from each other to bound a compartment;
  c) a focusing element having a mechanical axis, and operative for focusing the laser beam; and
  d) means for aligning the mechanical axis to coincide with the optical axis by adjustably mounting the focusing element relative to the laser with freedom of movement in a plane perpendicular to the optical axis, the aligning means including a holder for holding the focusing element, the holder being mounted on the support for movement between adjustment positions in which the focusing element is moved relative to the laser, and a fixed position in which the focusing element is fixed relative to the laser, the holder being mounted in the compartment and bounding a gap with the support members, the holder being a hollow tubular sleeve having an interior in which the focusing element is mounted, and an exterior wall on which at least one projection extends radially across the gap to engage the support members, at least one of the support members having an adhesive inlet extending to the compartment, and a curable adhesive injected through the inlet to fix the holder in said fixed position upon curing.

19. The focusing arrangement of claim 18, wherein the holder is constituted of a material transmissive to light of a predetermined wavelength, and wherein the adhesive is cured by exposure to said light transmitted through the holder.

20. The focusing arrangement of claim 18, wherein the holder is constituted of a plastic material having glass fibers embedded therein, the glass fibers being oriented generally parallel to the mechanical axis.

* * * * *